United States Patent
Volkmann

(10) Patent No.: US 8,349,048 B2
(45) Date of Patent: Jan. 8, 2013

(54) FILTER ARRANGEMENT

(75) Inventor: Thilo Volkmann, Soest (DE)

(73) Assignee: Volkmann GmbH, Soest (DE)

( * ) Notice: Subject to any disclaimer, the term of this patent is extended or adjusted under 35 U.S.C. 154(b) by 375 days.

(21) Appl. No.: 12/532,467

(22) PCT Filed: May 16, 2008

(86) PCT No.: PCT/EP2008/003979
§ 371 (c)(1),
(2), (4) Date: Feb. 18, 2010

(87) PCT Pub. No.: WO2008/116672
PCT Pub. Date: Oct. 2, 2008

(65) Prior Publication Data
US 2011/0192126 A1 Aug. 11, 2011

(30) Foreign Application Priority Data
Mar. 23, 2007 (DE) ...................... 20 2007 004 475 U

(51) Int. Cl.
*B01D 46/00* (2006.01)
(52) U.S. Cl. ............. 55/502; 55/341.1; 55/374; 55/376; 55/377; 55/498; 55/DIG. 26
(58) Field of Classification Search .................. 55/341.1, 55/374, 375, 376, 377, 378, 498, 502, DIG. 26; 210/450
See application file for complete search history.

(56) References Cited

U.S. PATENT DOCUMENTS

| 3,997,305 A | 12/1976 | Ulvestad et al. |
| 4,073,632 A | 2/1978 | Reinauer et al. |
| 4,138,234 A | 2/1979 | Kubesa |
| 5,202,021 A * | 4/1993 | Griffin et al. ................. 210/232 |
| 5,308,485 A * | 5/1994 | Griffin et al. ................. 210/232 |
| 5,964,909 A * | 10/1999 | Brunner .......................... 55/377 |
| 6,258,145 B1 | 7/2001 | Engel et al. |

(Continued)

FOREIGN PATENT DOCUMENTS
DE 816852 10/1951
(Continued)

OTHER PUBLICATIONS

International Search Report dated Sep. 16, 2008 for PCT/EP2008/003979, filed May 16, 2008.

*Primary Examiner* — Robert Clemente
(74) *Attorney, Agent, or Firm* — Rankin, Hill & Clark LLP

(57) ABSTRACT

The invention relates to a filter arrangement comprising a plate-shaped filter holder (12) provided with at least one stem-type protruberance (13) having an opening (11) said filter holder (12) being used to receive a filter element (14) in a sealed manner for each protuberance on the raw gas side of the filter holder. In order to ensure that the filter is changed easily with sufficient filtering safety, each filter element (14) is provided with an adapter collar (15) comprising at least one limb (15B; 15D) parallel to the protruberances. Said limb can be placed, from the raw gas side, inside or over the protruberance. A sealing arrangement (16) provided comprises sealing elements (16A, 16B) which are parallel to both the plates and to the protruberances and are used for the at least partial join between the protuberance and the adapter collar.

16 Claims, 4 Drawing Sheets

U.S. PATENT DOCUMENTS

2004/0237483 A1 12/2004 Clements
2005/0229563 A1* 10/2005 Holzmann et al. .............. 55/502

FOREIGN PATENT DOCUMENTS

| DE | 1851221 | 5/1962 |
| DE | 40 31 375 A1 | 4/1991 |
| DE | 90 14 198.9 | 4/1991 |
| DE | 41 34 679 A1 | 4/1993 |
| DE | 42 01 041 A1 | 7/1993 |
| DE | 203 12 074 U1 | 1/2005 |
| DE | 10 2004 005 211 A1 | 8/2005 |
| EP | 0 601 733 A1 | 6/1994 |
| FR | 2 791 579 | 10/2000 |

* cited by examiner

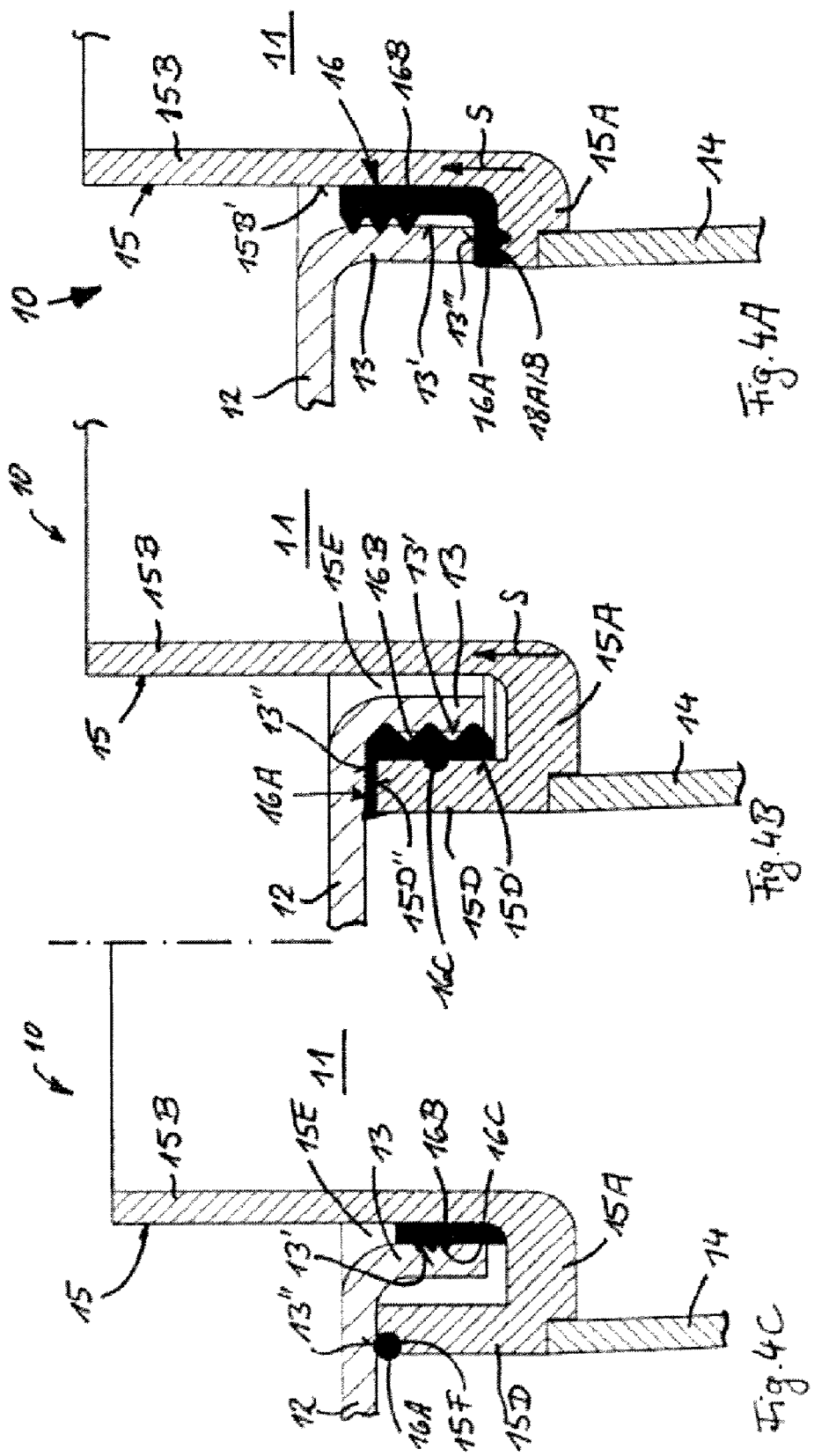

FILTER ARRANGEMENT

This application claims priority to and the benefit of the filing date of International Application No. PCT/EP2008/003979, filed May 16, 2008, which application claims priority to and the benefit of the filing date of German Application No. 20 2007 004475.5, filed Mar. 23, 2007, both of which are hereby incorporated by reference into the specification of this application.

FIELD OF THE INVENTION

The invention relates to filter arrangements and, more particularly, to filter arrangements including a plate-shaped filter holder presenting at least one neck-shaped protuberance while leaving clear, in each case, an opening that is associated with a filter cartridge.

TECHNOLOGICAL BACKGROUND

Filter elements that can be assembled or installed as construction units in a filter arrangement, in a number corresponding to the need, are usually screwed in a sealing manner on a plate-shaped filter holder, such as, for example, according to DE 203 12 074 U1, FIG. 1 which is incorporated by reference as background material for showing the same.

A typical application of generic filter arrangements consists of the so-called vacuum conveyance installations, as known from DE 203 12 074 U1, which presents a collection container for transported material that is aspired by a vacuum. The negative pressure of a vacuum pump is applied to the collection container, and the transported material is deposited by gravity on the bottom of the collection container, while the suction air leaves the collection container at the top through the opening of the plate-shaped filter holder. Already for the protection of the vacuum pump, and for the complete use the transported material, only the suction air is allowed to pass to the vacuum pump through the filter elements that close the openings, and not the transported material or dust components. Such filters, which can be made from ceramic, flow material or other filter surface material, present as a rule a cartridge shape (hanging cartridge). If the performance of a filter cartridge worsens or if the filter cartridge contains cracks and has to be replaced, in spite of regular counter-pressure cleaning, the cost is similarly high.

In the case of filter hoses in fine dust filters, the raw gas side hose openings are usually clamped between conic rings, and the external ring is screwed to the plate-shaped filter holder that is provided with openings (DE 41 34 679 A1) which is incorporated by reference as background material for showing the same. The external holder ring can also be welded to the perforation margin or the filter holder can be designed as one piece with the filter holder (DE 40 31 375 A1) which is incorporated by reference as background material for showing the same. The filter hoses can be replaced by removing an inner cone on their gas inlet opening, where the hose opening can present a bead-like clamping margin (DE 816 852 C) which is incorporated by reference as background material for showing the same.

Filter arrangements with adaption collars connected to the filter elements are also known. Thus DE 203 12 074 U1 presents a two-part adaption collar (FIGS. 1 and 2), which is screwed by means of a flange-like protruding attachment sheath with external threading and with the interposition of a ring seal with a flat, perforated filter holder plate, so that the attachment sheath and the adaption collar clamp the flat filter holder on opposite sides between themselves. The handling of such a filter arrangements during the filter replacement requires a certain degree of skill so that the desired lasting seal can also be achieved. Instead of a screw connection, DE 90 14 198 U1 which is incorporated by reference as background material for showing the same provides fixation pins on the pure gas side acting on an adapter flange of the filter element. For their fixation, it is necessary to weld an annular attachment collar for the fixation pins with considerable radial separation from the perforation of the flat filter holder plate to the latter. It is only in this way that the cartridge-shaped filter element, which is provided with its adapter flange forming a single piece, can be slid from the pure gas side, with interposition of a sealing collar, into the attachment collar, and put on the pure gas side on the plate-shaped filter holder. The insertion of the filter cartridge from the top is an impediment in many applications, and disadvantageous for the sealing function because of the raw gas pressure applied from below.

Generic filter arrangements, which are the starting point of the invention, present at least one neck-shaped protuberance of the plate-shaped filter holder. They are known from U.S. Pat. No. 3,997,305, among others, which is incorporated by reference as background material for showing the same. According to the latter patent, a spreading basket with a filter hose that is placed around its opening over the neck-shaped protuberance and pulled in a sealing manner close to the external margin of the neck-shaped protuberance by an external clamping ring. To receive venturi-like nozzles in the interior of the hose, a piece of pipe with stepped diameter is slid into the neck-shaped protuberance, and welded firmly to it. An additional generic hose filter arrangement is known from DE 203 12 074 U1, FIG. 4B. In both known applications of plate-shaped filter holders with neck-shaped protuberances forming an opening, which are the starting point of the invention, no special sealing arrangements are used. Rather, the purpose is to have the filter hose be applied in a sealing manner on the external circumference of the neck-shaped protuberance under the radial pressure of a clamping means. According to DE 203 12 074 U1, the neck-shaped protuberance serves in addition as a welding collar for the lasting attachment of a non-replaceable filter cartridge with support function for the filter hose. The generic filter arrangements are in fact easy to manufacture and flow enhancing; however, the clamp attachment of the filter hose that has been put over is found to be time consuming. In addition, such filter arrangements have been unsuitable so far for finished filter elements consisting of a filter cartridge with prefabricated adaption collar.

DESCRIPTION OF THE INVENTION

The invention is based on the problem of providing a simple design for filter replacement in a filter arrangement of the generic type with sufficient filtering safety.

To solve the problem, provided is a filter arrangement having wherein each filter element is provided with an adapter collar, and the adapter collar presents at least one first limb which is parallel to the protuberance with respect to the protuberance, where this limb can be inserted from the raw gas side or via the protuberance, and in that a sealing arrangement is provided, which presents sealing elements that are parallel to both the plate and also the protuberance, for the at least partial insertion between the areas of the protuberance and areas of the adapter collar.

In this way, the adapter collar can be inserted radially in a sealing manner from the raw gas side into the neck-shaped protuberance of the plate-shaped filter holder, or it can be put over the latter, until an area of the adapter collar, which is parallel to the plate, is applied radially outside of the protuberance of the filter holder in a sealing manner against the raw gas side of the filter holder. This can occur in such a way that the sealing arrangement is already applied against the adapter collar, and thus slid together with the adapter collar in or over the neck-shaped protuberance of the plate-shaped filter holder.

The frictional resistance of the sealing arrangement on the neck-shaped protuberance may already be sufficient to secure the filter element on the plate-shaped filter holder, where suction pressure applied to the filter element reinforces the sealing effect. According to another aspect of the invention, a quick release safety latch can be provided on the adapter collar, which can be applied, for example, by simple flipping over of a securing clip, on the backside of the plate-shaped filter holder, in such a way that the adapter collar is held as a result in that target position. Even if this quick release safety latch fails, for example, if it opens, it can ensure that the filter element is prevented from sliding completely out of the sealing area that is parallel to the protuberance, and thus a safety sealing effect is maintained.

Another aspect relates to hygiene, which is ensured by the fact that the sealing element that is parallel to the plate protects the connection and sealing arrangement from damaging cavity and lump formation.

The above mentioned components as well as the components which are claimed and described in the embodiment examples, and to be used according to the invention, are not subject to any special exception conditions with regard to their size, shape, material selection and technical design, so that the selection criteria known in the application field can be used without restriction.

BRIEF DESCRIPTION OF THE DRAWINGS

Additional details, characteristics, and advantages of the object of the invention can be obtained from the dependent claims as well as from the description given below of the corresponding drawing and table, in which embodiment examples of a filter arrangement are represented for illustration.

In the drawing,

FIGS. 4A-C show an axial cross section—in cutouts—of alternative filter arrangements of different design of the neck-shaped protuberance and the seal.

DETAILED DESCRIPTION OF EMBODIMENTS

Figure 1:
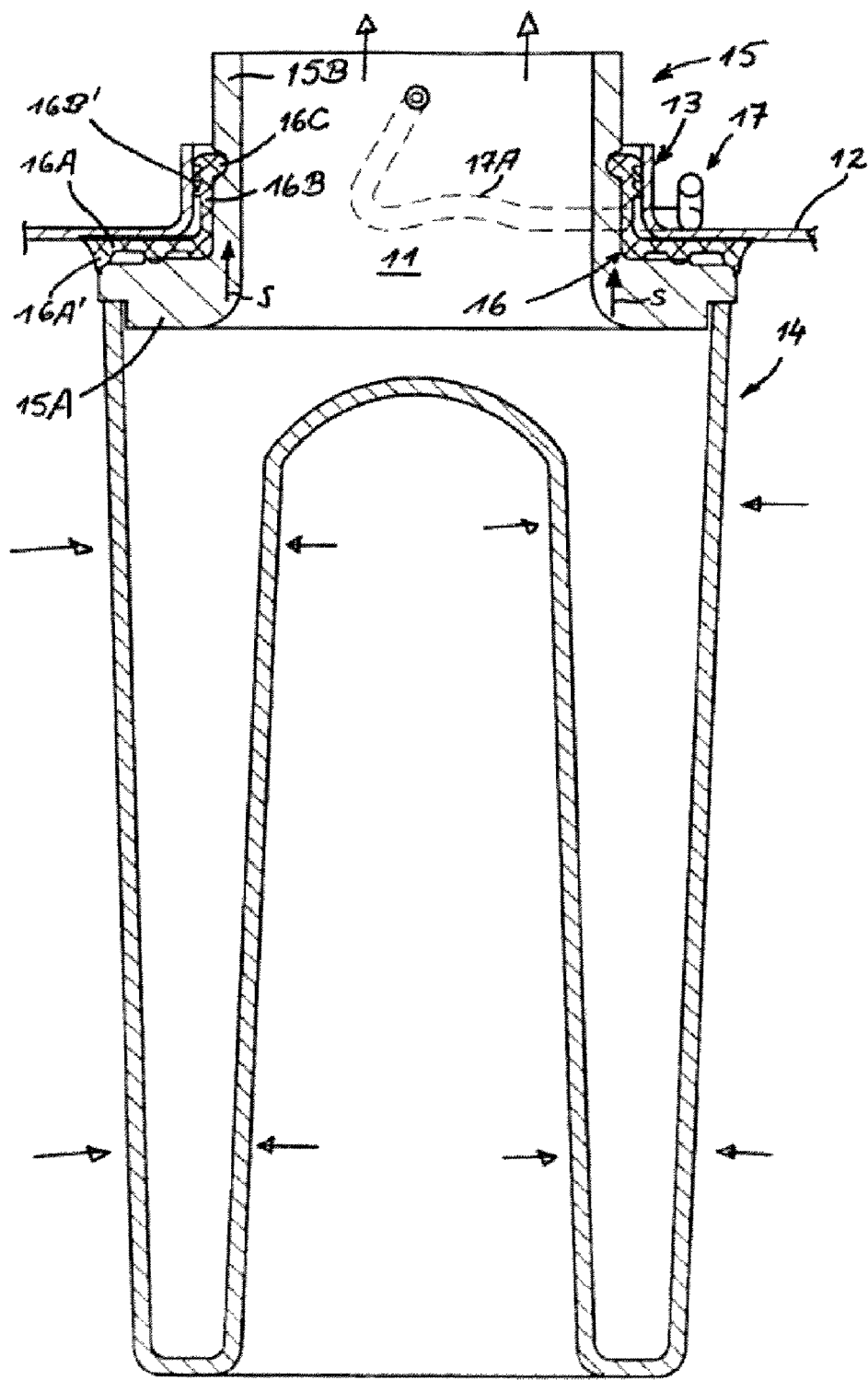
FIG. 1 shows an axial cross section through a filter arrangement according to the invention.

Referring now to the drawings wherein the showings are for the purpose of illustrating preferred and alternative embodiments of the invention only and not for the purpose of limiting same, FIG. 1 shows a plate-shaped filter holder 12 which can be of any size, and which has at least one opening 11 whose margin is formed by a neck-shaped protuberance 13 which, in the represented embodiment example, forms a substantially cylindrical, molded collar that extends upward. Other collar shapes as well as multipart designs of the protuberance and the filter holder are possible, within the scope of the invention, to an almost limitless extent; for example, they may be welded to each other.

A filter element 14 of appropriate material type and shape is connected in a sealing manner with an adapter collar 15 on its opening margin. In the represented embodiment example, the adapter collar 15 presents two limbs, in a cross sectional view, namely a limb 15A parallel to the plate, and a limb 15B parallel to the protuberance. Both limbs are, in the represented embodiment example, areas of a single-piece component. It is also possible to use adapter collars assembled from several elements, such as limbs that are at first separated. The cross section of the limb 15B that is parallel to the protuberance is sufficiently smaller on its external side than the clear cross section of the protuberance 13 of the filter holder 12, so that the adapter collar 15 can be inserted with peripheral clearance into the protuberance 13. The interstice is bridged by a sealing arrangement 16, which presents a sealing element 16A parallel to the plate, and a sealing element 16B parallel to the protuberance. In the represented embodiment example, the sealing arrangement 16 forms a single piece. It has continuous peripheral sealing lips 16A' on its limb 16A parallel to the plates, on the side of the adapter collar 15, and continuous peripheral sealing lips 16B', in the area of the radial external side of the limb 16B parallel to the protuberance, which are applied in a sealing manner in the inner circumference of the protuberance 13 in the state of use. One or more circumferential or shorter bead-like protrusions 16C of the sealing arrangement 16 can correspond to appropriate recesses on the periphery of the limb 15B, which is parallel to the protuberance, of the adapter collar 15, so that the sealing arrangement can be inserted into a prescribed position on the adapted collar 15, before the filter element 14 is inserted with its adapter collar 15 into the recess 13.

A quick release safety latch 17 in the form of a springy securing clip 17A can be suspended in such a way that it can swivel in appropriate recesses—such as perforations—of the limb 15B, which is parallel to the protuberance, of the adapter collar 15, and shaped in such a way that the securing clip 17A is applied on the backside of the filter holder 12 in such a way that the filter element 14 is applied securely as a result on the filter holder 12 under operating conditions. Even if this quick release safety latch fails, for example, if it opens, it can ensure that the filter element is prevented from sliding completely out of the sealing area parallel to the protuberance, and thus at least a radially acting safety sealing effect is maintained. This can be achieved, for example, by appropriate dimensioning of the suspension area of the securing clip.

According to another embodiment of the invention, which by itself is also of inventive significance, a storage or fluid treatment element—not shown in the drawing—for cleaning purposes, for example, can be associated with the adapter collar (15) on the backside of the filter holder, which is turned away from the filter element. This element can be arranged after the outlet opening of the limb (15B), which is parallel to the protuberance, particularly with axial and/or radial separation leaving at least one passage for liquid, and it can be supported on the adapter collar (15), the filter holder (12) and/or on a safety latch (15C, 17). As holder element for the storage or liquid treatment element, a spacer with double function can be used, which can also fix the closed position of the safety latch. The holder element can be designed as a bayonet closure that works in collaboration with the safety latch.

Figure 2:
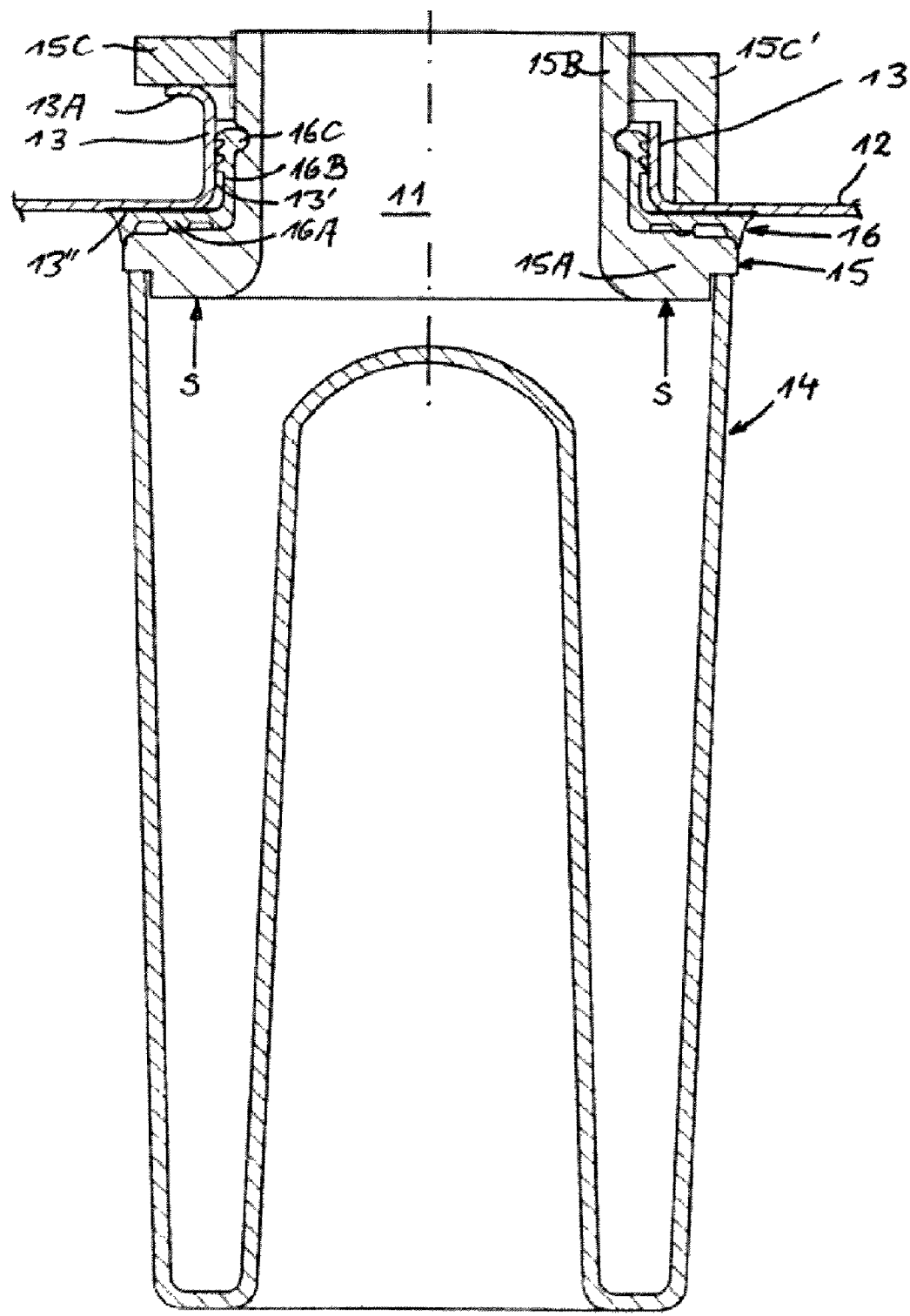
FIG. 2 shows an alternative embodiment of the filter arrangement according to FIG. 1 in two different versions.

In the embodiment example according to FIG. 2, a screw locking device is used instead of a securing clip, where in the left half of the figure a screw nut 15C is applied against a crimping 13A of the protuberance 13, while in the right half of the figure, the screw nut 15C' is designed as a coupling nut, and supported on the backside of the filter holder 12. For the rest, the structure and function of this embodiment example correspond to those according to FIG. 1.

The embodiments according to FIGS. 4A to 4C illustrate additional design possibilities for a protuberance 13, an adapter collar 15, and a sealing arrangement 16. All the embodiment examples 4A to 4C share the fact that the protuberance 13 is directed inward in that case, i.e. toward the filter element 14.

Figure 3:
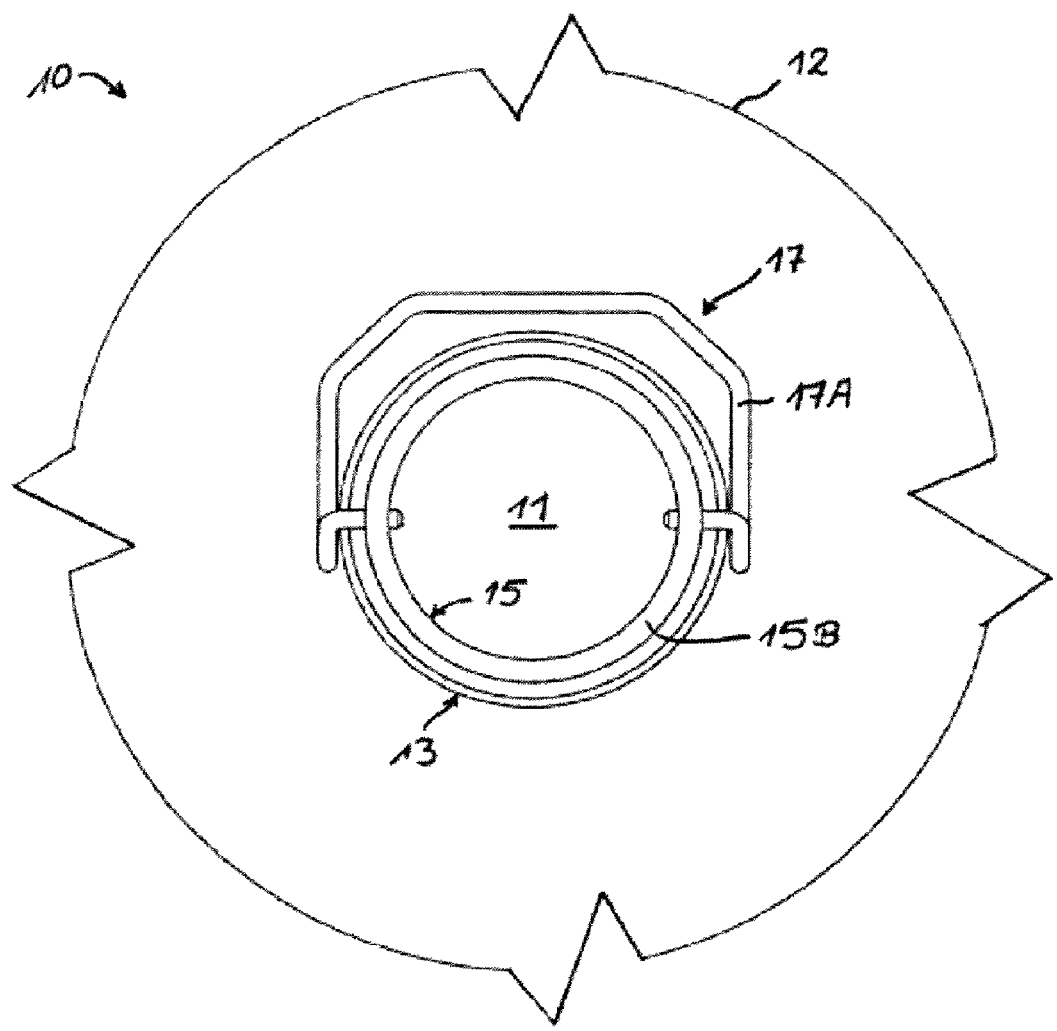
FIG. 3 shows a top view from above of the filter arrangement according to FIG. 1.

According to FIG. 4A, the adapter collar 15 is designed, as in the embodiment example according to FIGS. 1-3, with two limbs 15A/15B and made as a single piece, where the limb 15A parallel to the plates is braced against the front edge of the protuberance 13 with the interposition of the one-piece, two-limbed sealing arrangement 16. A grooving and ribbing 18A/18B between the limbs of the sealing arrangement and of the adapter collar, which limbs are parallel to the plates, improves the axial sealing effect in spite of the small overall dimension.

In the embodiment example according to FIG. 4B, the adapter collar 15 presents a sealing limb 15D, which is parallel to the protuberance, and which posses a limb surface 15D' parallel to the protuberance and a limb surface 15D" parallel to the plate. The sealing limb 15D is shifted over the protuberance 13 of the filter holder 12 from below, where the radial external side of the protuberance 13, and the adjacent surface area, which is parallel to the plate, on the bottom side of the filter holder 12, serve as sealing surfaces 13' and 13". The protuberance 13 thus engages advantageously in a circumferential groove 15E provided on the adapter collar 15. The sealing arrangement 16 is, for the rest, designed in the same functional way as the embodiment example according to FIGS. 1-3, as one can easily see in FIG. 4B.

In the embodiment example according to FIG. 4C, the structure of the adapter collar 15 corresponds substantially to the adapter collar 15 according to FIG. 4B, where, however, both limbs 15B and 15D, which are parallel to the protuberance, of the adapter collar 15 have sealing functions. In this embodiment example, the sealing arrangement 16 is in two parts, and it consists of a sealing element 16B parallel to the protuberance, which extends between the radial external surface of the radially internal limb 15B, which is parallel to the protuberance, of the adapter collar 15, on the one hand, and the radial inner surface 13" of the protuberance 13, on the other hand. A sealing element 16A parallel to the plates is designed and arranged separately and similarly to an O-ring seal. For this purpose, the opening margin of the limb 15D, which is parallel to the protuberance, of the adapter collar 15 presents an appropriate reception recess 15F.

An additional aspect is hygiene, which is ensured by the fact that the sealing element parallel to the plates, particularly on its radial external side, protects the connecting and sealing arrangement against damaging cavity and lump formation. Overall, the invention achieves an arrangement in the sealing area between the filter holder and the filter element, which presents few or no slots and offsets, so that it is possible advantageously to take into account above all the hygienic viewpoints which play a special role, for example, with pharmaceutical products.

Further, as is discussed in greater detail above, the invention of this application relates to a filter arrangement comprising at least one plate-shaped filter holder (12) presenting at least one neck-shaped protuberance (13) with an opening (11), for the sealing reception of one filter element (14) per protuberance, from the raw gas side of the filter holder, wherein each filter element (14) is provided with an adapter collar (15), and the adapter collar (15) presents at least one limb (15B; 15D) which is parallel to the protuberance, with respect to the protuberance (13), where this limb can be inserted from the raw gas side in or over the protuberance (13), and in that a sealing arrangement (16) is provided, which presents sealing elements (16A, 16B) that are parallel both to the plate and to the protuberance, for the at least partial insertion between the protuberance (13) and the adapter collar (15).

According to yet another embodiment, the adapter collar (15) presents a limb (15B) that is parallel to the protuberance and protrudes radially over the limb (15A) that is parallel to the plate.

According to a further embodiment, the filter arrangement can further include a safety latch, such as a quick release safety latch (17), for the adapter collar (15) with respect to the filter holder (12) is provided.

According to yet a further embodiment, the quick release safety latch (17) engages on the filter holder on the side of the filter holder (12) facing the filter element (14).

According to another embodiment, the quick release safety latch (17) presents a swiveling securing clip (17A).

According to a further embodiment, when the securing clips (17A) are not locked, the quick release safety latch (17) prevents the adapter collar (15) of the filter element from sliding completely out of the sealing area that is parallel to the protuberance.

According to yet a further embodiment, the neck-shaped protuberance (13) is molded on the opening margin of the filter holder (12) as collar.

According to yet another embodiment, between the protuberance (13) of the filter holder (12), and a limb (15B or 15D) of the adapter collar (15), which is parallel to the protuberance, a gap remains, which is bridged by a part of the sealing arrangement (16).

According to yet a another embodiment, at least one continuous circumferential sealing lip (16B') of the sealing arrangement (16), on the sealing side facing the protuberance (13) is provided.

According to yet a further embodiment, at least one continuous circumferential sealing lip (16A'), on the sealing side facing the adapter collar (15).

According to yet a further embodiment, a holding means for holding the sealing arrangement (16) on the adapter collar (15) is provided for the joint sliding of the adapter collar including the sealing arrangement in or over the protuberance (13).

According to another embodiment, a sealing limb (15D) of the adapter collar (15), which is parallel to the protuberance is provided.

According to yet another embodiment, a reception groove (15E), which is formed from a limb (15B), which is parallel to the protuberance, and a sealing limb (15D), which is parallel to the protuberance, of the adapter collar (15), for the protuberance (13) of the filter holder (12).

According to a further embodiment, at least one bead-like protrusion (16C) of the sealing arrangement (16) and a corresponding recess on the adapter collar (15) is/are provided.

According to yet a further embodiment, provided is a corresponding grooving and ribbing (18A; 18B) between limbs of the sealing arrangement and of the adapter collar that are parallel to the plate.

Yet even further, any of the these embodiments can be combined with other embodiments forming yet even further embodiments.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A filter arrangement comprising at least one plate-shaped filter holder having at least one neck-shaped protuberance with an opening whose margin is at least partially formed by the at least one neck-shaped protuberance, the opening being configured to sealingly receive a filter element from a raw gas side of the filter holder, the filter element being provided with an adapter collar having at least one limb which is parallel to the at least one protuberance, the at least one limb is configured to be insertable from the raw gas side in or over the at least one protuberance, the filter arrangement further including a sealing arrangement which presents sealing elements that are parallel both to the plate-shaped filter holder and to the protuberance for the at least partial insertion between the protuberance and the adapter collar.

2. The filter arrangement according to claim 1, wherein the at least one limb includes a first and a second limb and wherein the adapter collar presents the first limb that is parallel to the protuberance and protrudes radially over the second limb that is parallel to the plate-shaped filter holder.

3. The filter arrangement according to claim 1, wherein the neck-shaped protuberance is molded on the opening margin of the filter holder as a collar.

4. The filter arrangement according to claim 1, wherein between the protuberance of the filter holder, and a limb of the adapter collar, which is parallel to the protuberance, a gap remains, which is bridged by a part of the sealing arrangement.

5. The filter arrangement according to claim 1, further including at least one continuous circumferential sealing lip of the sealing arrangement, on the sealing side facing the protuberance.

6. The filter arrangement according to claim 1, further including holding means for holding the sealing arrangement on the adapter collar for the joint sliding of the adapter collar including the sealing arrangement in or over the protuberance.

7. The filter arrangement according to claim 1, further including a sealing limb of the adapter collar, which is parallel to the protuberance.

8. The filter arrangement according to claim 7, further including a reception groove, which is formed from the at least one limb, which is parallel to the protuberance, and the sealing limb, which is parallel to the protuberance, of the adapter collar, for the protuberance of the filter holder.

9. The filter arrangement according to claims 1, further including at least one bead-like protrusion of the sealing arrangement and a corresponding recess on the adapter collar.

10. The filter arrangement according to claim 1, further including a corresponding grooving and ribbing between limbs of the sealing arrangement and of the adapter collar that are parallel to the plate-shaped filter holder.

11. A filter arrangement comprising at least one plate-shaped filter holder having at least one neck-shaped protuberance with an opening configured to sealingly receive a filter element from a raw gas side of the filter holder, the filter element being provided with an adapter collar having at least one limb which is parallel to the at least one protuberance, the at least one limb is configured to be insertable from the raw gas side in or over the at least one protuberance, the filter arrangement including a sealing arrangement which presents sealing elements that are parallel both to the plate-shaped filter holder and to the protuberance for the at least partial insertion between the protuberance and the adapter collar, the filter arrangement further including a safety latch, for the adapter collar with respect to the filter holder.

12. The filter arrangement according to claim 11, wherein the safety latch engages on the filter holder on the side of the filter holder facing the filter element.

13. The filter arrangement according to claim 11, wherein the safety latch presents a swiveling securing clip.

14. The filter arrangement according to claim 13, wherein when the securing clip is not locked, the safety latch prevents the adapter collar of the filter element from sliding completely out of the opening.

15. A filter arrangement comprising at least one plate-shaped filter holder having at least one neck-shaped protuberance with an opening configured to sealingly receive a filter element from a raw gas side of the filter holder, the filter element being provided with an adapter collar having at least one limb which is parallel to the at least one protuberance, the at least one limb is configured to be insertable from the raw gas side in or over the at least one protuberance, the filter arrangement including a sealing arrangement which presents sealing elements that are parallel both to the plate-shaped filter holder and to the protuberance for the at least partial insertion between the protuberance and the adapter collar, the filter arrangement further including at least one continuous circumferential sealing lip of the sealing arrangement, on a sealing side facing the adapter collar.

16. A filter arrangement comprising at least one plate-shaped filter holder having at least one neck-shaped protuberance having an opening and the opening configured to sealingly receive a filter element from a raw gas side of the filter holder, the filter element being provided with an adapter collar having at least one limb which is parallel to the at least one protuberance, the at least one limb is configured to be insertable from the raw gas side into the at least one protuberance, the filter arrangement further including a sealing arrangement which presents sealing elements that are parallel both to the plate-shaped filter holder and to the protuberance for the at least partial insertion between the protuberance and the adapter collar.

* * * * *